(12) United States Patent
Ido et al.

(10) Patent No.: US 7,203,184 B2
(45) Date of Patent: Apr. 10, 2007

(54) DATA TRANSMITTER, DATA RECEIVER, AND DATA TRANSMITTING/RECEIVING METHOD

(75) Inventors: Daiji Ido, Yokohama (JP); Koji Imura, Machida (JP); Akihiro Miyazaki, Sakai (JP); Koichi Hata, Katano (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 993 days.

(21) Appl. No.: 10/069,933

(22) PCT Filed: Jul. 9, 2001

(86) PCT No.: PCT/JP01/05932

§ 371 (c)(1),
(2), (4) Date: Mar. 1, 2002

(87) PCT Pub. No.: WO02/05497

PCT Pub. Date: Jan. 17, 2002

(65) Prior Publication Data

US 2002/0150078 A1 Oct. 17, 2002

(30) Foreign Application Priority Data

Jul. 7, 2000 (JP) .............................. 2000-206615

(51) Int. Cl.
*H04J 3/24* (2006.01)
*H04L 12/28* (2006.01)
*H04L 12/56* (2006.01)

(52) U.S. Cl. ................... 370/349; 370/230.1; 370/231; 370/236

(58) Field of Classification Search ................ 370/349, 370/229–231, 235–236
See application file for complete search history.

(56) References Cited

U.S. PATENT DOCUMENTS 5,684,791 A * 11/1997 Raychaudhuri et al. .. 370/310.2

(Continued)

FOREIGN PATENT DOCUMENTS

JP 09191314 7/1997

(Continued)

OTHER PUBLICATIONS

Japanese Office Action dated May 28, 2002.

(Continued)

*Primary Examiner*—Chi Pham
*Assistant Examiner*—Ronald Abelson
(74) *Attorney, Agent, or Firm*—Steven, Davis, Miller & Mosher, LLP (57) ABSTRACT

Received packets are preserved in a receiving buffer 102; a playback decision section 103 decides whether the preserved packets are in time for the playback time or not; the playback orders and the preservation addresses of the preserved packets which have been decided to be in time are memorized in a pointer 104 for playback; the preserved packets are read and played back according to the pointer 104 for playback. And, the playback orders and the preservation addresses of the preserved packets are memorized in a pointer 106 for preservation; and a media conversion section 107 reads the preserved packets according to the pointer 106 for preservation, and memorizes them after conversion into packets with a form by which the packets may be memorized in a preservation memory 108.

1 Claim, 10 Drawing Sheets

U.S. PATENT DOCUMENTS

| | | | | |
|---|---|---|---|---|
| 6,104,757 | A * | 8/2000 | Rhee | 375/240.12 |
| 6,275,471 | B1 * | 8/2001 | Bushmitch et al. | 370/248 |
| 6,483,804 | B1 * | 11/2002 | Muller et al. | 370/230 |
| 6,975,629 | B2 * | 12/2005 | Welin | 370/392 |
| 2005/0117521 | A1 * | 6/2005 | Abrol et al. | 370/252 |

FOREIGN PATENT DOCUMENTS

| | | |
|---|---|---|
| JP | 10234045 | 9/1998 |
| JP | 10262245 | 9/1998 |
| JP | 10313350 | 11/1998 |
| JP | 11055345 | 2/1999 |
| JP | 11284657 | 10/1999 |
| JP | 2000115143 | 4/2000 |

OTHER PUBLICATIONS

English translation of Japanese Office Action.

T. Hasegawa, et al.; "A Study on Retransmission Protocol for Data Produced in Real Time Manner", Joho Shori Gakkai Kenkyu Houkoku (Multimedia Tsuushin to Bunsan Shori 85-9), vol. 97, No. 104, Joho Shori Gakkai, (Japan) Nov. 7, 1997, pp. 49-54.

* cited by examiner

POINTER BEFORE RECEIVING

| SEQUENCE NUMBER (SN) | BUFFER ADDRESS |
|---|---|
| 1 | 0001 |
| 2 | 0006 |
| 4 | 0004 |
| 5 | 0005 |
| 6 | 0007 |

RECEIVED DATA SN=3, BUFFER ADDRESS=0008

FIG.4B

POINTER AFTER RECEIVING

| SEQUENCE NUMBER (SN) | BUFFER ADDRESS |
|---|---|
| 1 | 0001 |
| 2 | 0006 |
| 4 | 0004 |
| 5 | 0005 |
| 6 | 0007 |
| 3 | 0008 |

FIG.4C

POINTER AFTER SORTING

| SEQUENCE NUMBER (SN) | BUFFER ADDRESS |
|---|---|
| 1 | 0001 |
| 2 | 0006 |
| 3 | 0008 |
| 4 | 0004 |
| 5 | 0005 |
| 6 | 0007 |

DATA TRANSMITTER, DATA RECEIVER, AND DATA TRANSMITTING/RECEIVING METHOD

TECHNICAL FIELD

The present invention relates to a data transmission apparatus, a data receiving apparatus, and a data transmitting-receiving method. More particularly, the invention relates to a data transmission apparatus used for a server for data communication which is independently connected to a packet transmission channel, a server for data communication which is installed in a switching station apparatus, a sever server which is installed in a base station apparatus of a mobile communication system, and so on; a data receiving apparatus used for an information communication terminal apparatus, such as a personal computer, for data transmitting-receiving through a wire channel, or for a mobile station apparatus in a mobile communication system such as a cellular telephone, and an information communication terminal apparatus provided with a cellular telephone function and a computer function; a data transmitting-receiving method between the data transmission apparatus, and the data receiving apparatus; and, a data transmission apparatus, a data receiving apparatus, and a data transmitting-receiving method, which efficiently perform playback and preservation of moving images and voice data in a communication environment in which code errors and congestion are easily occurred.

BACKGROUND ART

Conventionally, congestion has been occurred during transmission in a packet network to cause loss of packet data due to collision when the network is disorganized. When the congestion is generated, the network is disorganized more and more, and there is increased packet delay in the case of retransmission of all the lost packets.

Therefore, it is considered that a large number of memories are arranged at a receiving side, and playback is started after receiving all the information on moving images when the packet transmission is used for communication of the moving images. However, the above method may not be applied for real-time communication as there is large delay.

In order to solve the problem, a transmission method disclosed in the prior Japanese Patent Application Publication No. Hei-10 (1998)-262245 has been proposed. This transmission method adopts hierarchical coding for coding of moving pictures, forms packets according to their significance, and only information which may be transmitted in one moving-image frame cycle is sent in the decreasing order of significance.

In the transmission method using the hierarchical coding, there is a less disorganized network, as only information with higher significance is transmitted, and one with lower significance is discarded when the network is disorganized. Even when packets are discarded, playback may be performed with less degradation in picture quality at a receiving side, using packets with higher significance.

However, there has been a problem in a conventional apparatus that packets, which have been received late for playback time (display time) are discarded, and discarded packets may not be preserved in a receiving apparatus as buffer control is performed in order to display images.

Moreover, there has been another problem that transmission bands are uselessly used, as there is performed retransmission of data which are discarded, and, accordingly, not played back when the retransmitted packets are not in time for the playback time, even if the retransmission of packets is requested by a receiving side.

DISCLOSURE OF THE INVENTION

A first object of the present invention is to provide a data transmission apparatus, a data receiving apparatus, and a data transmitting-receiving method, in which packets which has been late for playback time such as display time may be preserved without discarding at a receiving side.

The object is realized by the following way; decision to discard packets is performed separately in playback processing and in preservation one; and specifically, packets, which are received before the playback time, are used for both of playback and preservation, and packets, which are received after the playback time, are used only for preservation.

A second object of the present invention is to provide a data transmission apparatus, a data receiving apparatus, and a data transmitting-receiving method, by which useless use of transmission bands, which is caused by retransmission of packets, may be controlled.

The object is realized by request of packet retransmission which is performed when the time at which the packets will be received after retransmission is estimated and the estimated time is in time for retransmission of the packets.

BEST MODE FOR CARRYING OUT THE INVENTION

Hereinafter, embodiments of the present invention will be described, referring to drawings.

(Embodiment 1)

Figure 1:
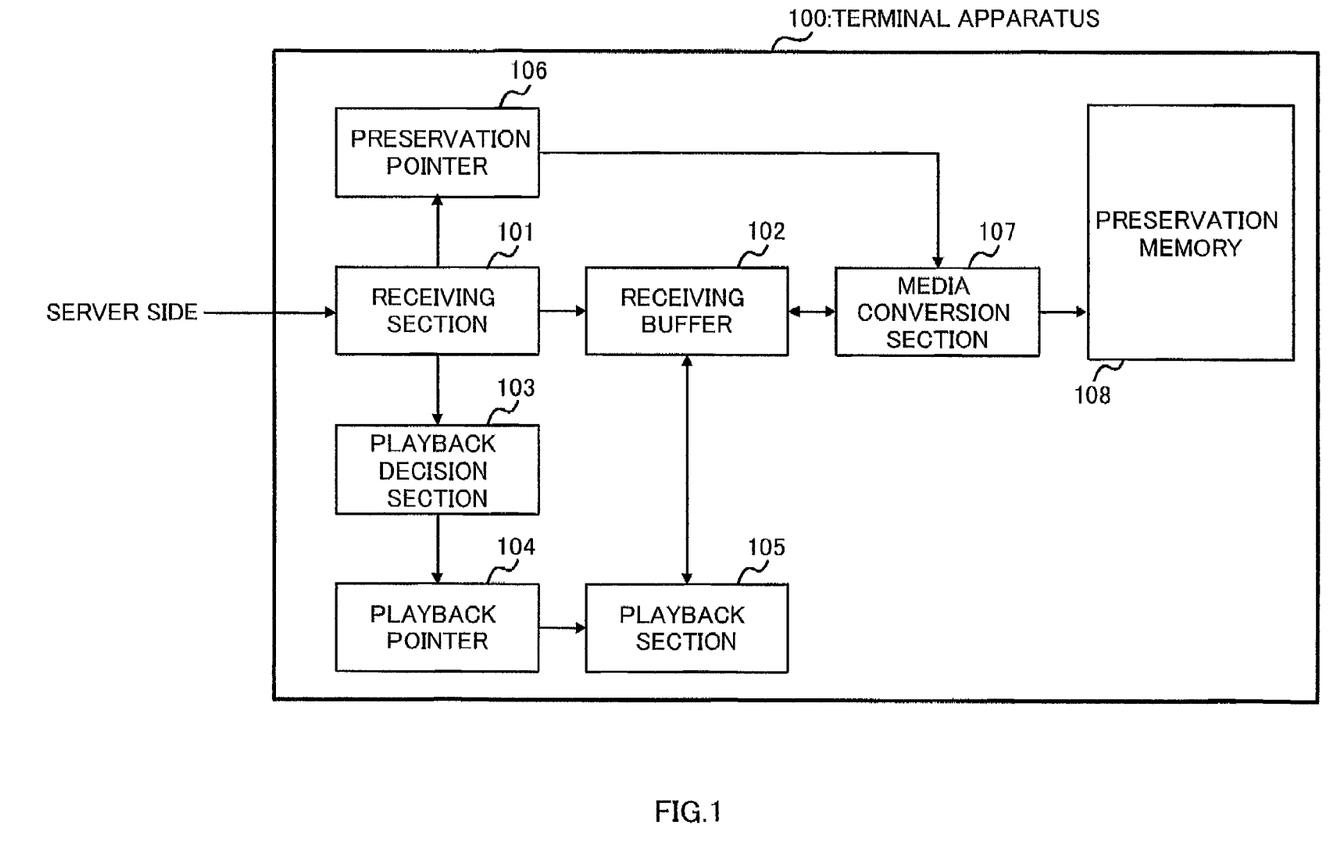
FIG. 1 is a block diagram showing a configuration of a terminal apparatus according to an embodiment 1 of the present invention.

FIG. 1 is a block diagram showing a configuration of a terminal apparatus according to the embodiment 1 of the present invention. A terminal apparatus 100 shown in FIG. 1 is, for example, an information communication terminal apparatus, such as a personal computer, for data transmitting-receiving through a wire channel, or a mobile station apparatus, in a mobile communication system, such as a cellular telephone and an information communication terminal apparatus provided with a cellular telephone function, and a computer function.

An apparatus at the other side, communicating with the terminal apparatus 100, is, for example, a server, and transmits packets storing images and voice data to the terminal apparatus 100. The server is, for example, an apparatus which is independently connected to a communication channel, and is installed in a switching station apparatus, or a base station apparatus in a mobile communication system.

The terminal apparatus 100 mainly comprises as shown in FIG. 1: a receiving section 101; a receiving buffer 102; a playback decision section 103; a pointer 104 for playback; a playback section 105; a pointer 106 for preservation; a media conversion section 107; and a preservation memory 108.

The receiving section 101 receives packets transmitted from the server through a network. The receiving buffer 102 preserves received packets received at the receiving section 101. The playback decision section 103 decides whether the received packets which the receiving section 101 has received are in time for playback time and may be played back.

The pointer 104 for playback memorizes preservation positions of packets, which are decided in the playback decision section 103 to be in time for the playback time, in the receiving buffer 102. The playback section 105 plays back the packets by reading out the packets from the receiving buffer 102 according to the pointer 104 for playback.

The pointer 106 for preservation memorizes the preservation position of the received packets, which the receiving section 101 has received, in the receiving buffer 102.

The media conversion section 107 reads the packets from the receiving buffer 102 according to the pointer 106 for preservation, and the preservation form of the packets are converted into that of the preservation memory 108. The preservation memory 108 preserves the data converted in the media conversion section 107.

Figure 2:
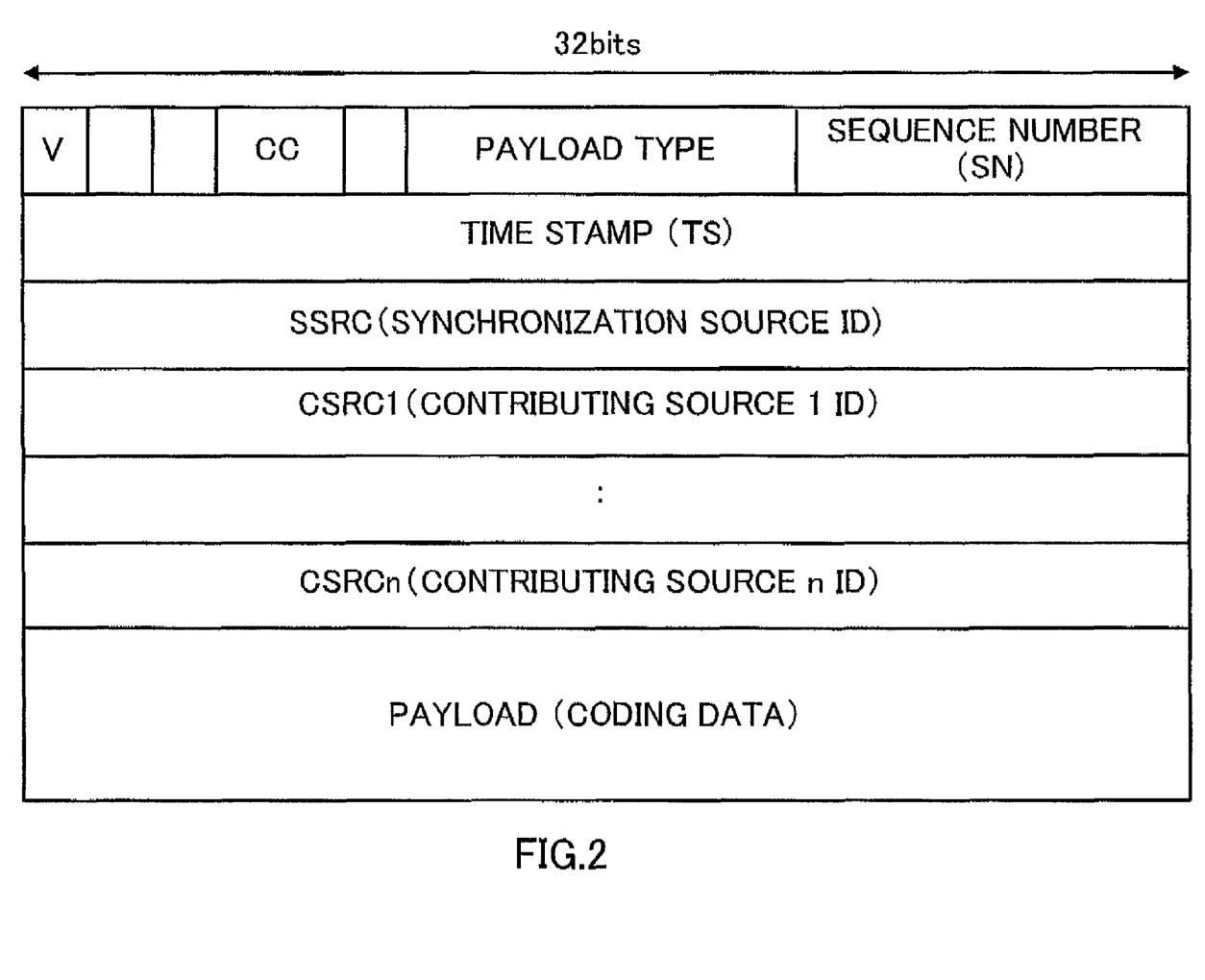
FIG. 2 is a configuration drawing of received packet data in the terminal apparatus according to the above-described embodiment.

One example of a configuration of a received packet in the receiving section 101 is shown in FIG. 2. The received packet is of, for example, 32 bits in total length, and mainly comprises bits for: a payload type showing the type of storage data; a sequence number SN which is given to the packets in the order according to which the packets are transmitted; a time stamp TS which is given as packet generation time to the packets; and a payload in which actual data is stored.

The communication terminal 100 may detect lost packets by monitoring the sequence numbers SNs, and the pointers may be reordered (sorted) for preservation or for playback. Moreover, the communication terminal 100 calculates a relative value from standard time, and, then, playback time, using a time stamp TS denoting a packet generation time.

Figure 3:
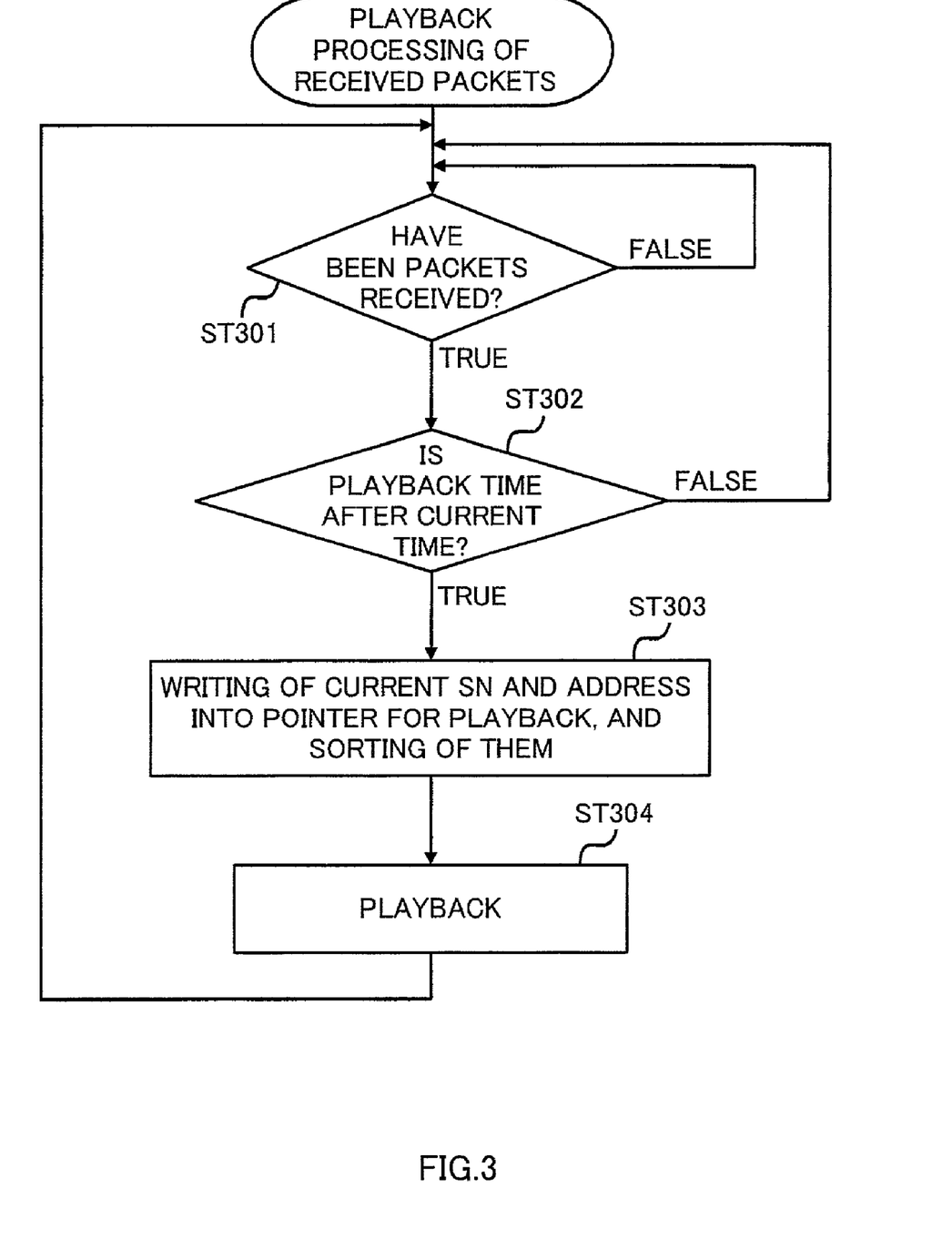
FIG. 3 is a flow diagram showing one example of the playback operation for received packets in the terminal apparatus according to the above-described embodiment.

Then, the operation of the terminal apparatus 100 will be described, referring to a flow diagram. FIG. 3 is a flow diagram showing one example of the operation of the terminal apparatus according to the present embodiment. In the first place, the operation by which a received packet is played back will be described, referring to the flow diagram shown in FIG. 3.

In FIG. 3, the receiving section 101 decides at the step (hereinafter, called as "ST") 301 whether a packet has been received or not. When the packet has been received, the operation proceeds to ST302.

The playback decision section 103 decides at ST302 whether the playback time of the received packet is before or after the current time. As it has already been past the playback time of the received packet when the playback time is before the current time, the received packet is not played back and the operation returns to ST301. And, it is decided that it is possible to play back the received packet when the playback time of the received packet is after the current time, and the operation proceeds to ST303.

At ST303, the pointer 104 for playback sequentially sorts the sequence numbers, and the preservation addresses of the received packets are output in order of sequence number after the sequence numbers of the received packets and the preservation addresses in the receiving buffer are memorized.

At ST304, the playback section 105 plays back the packets by reading out the received packets from the receiving buffer 102, based on the preservation addresses output from the playback pointer.

Figure 4A:
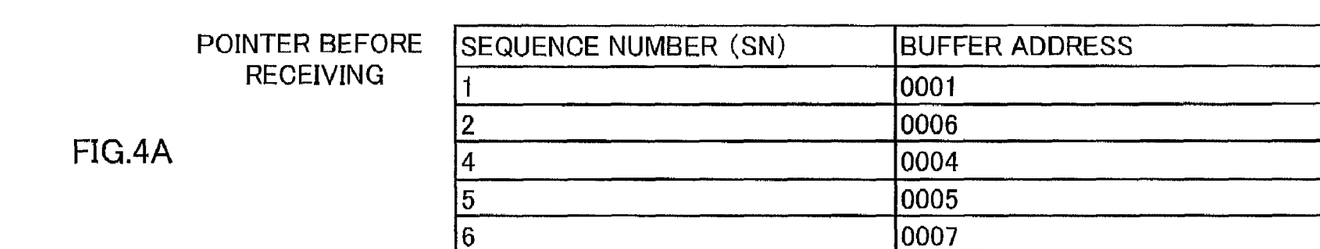
FIG. 4A is an explanatory drawing of the sorting operation of a pointer for retransmission or a preservation pointer in the terminal apparatus according to the above-described embodiment.
Figure 4B:
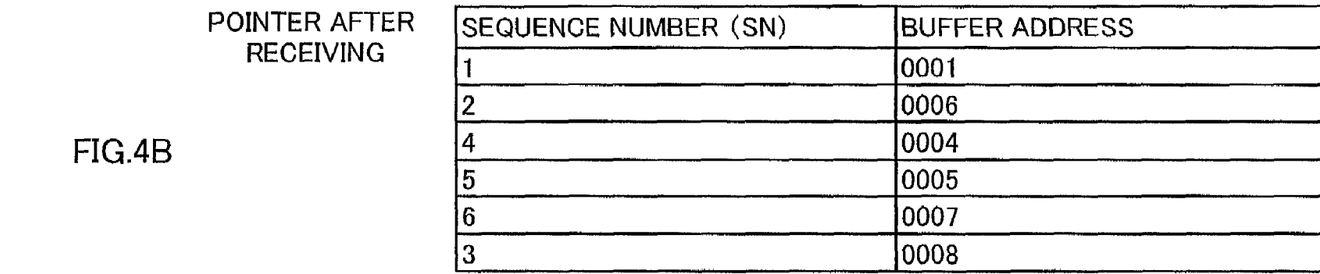
FIG. 4B is an explanatory drawing of the sorting operation of a pointer for retransmission or a preservation pointer in the terminal apparatus according to the above-described embodiment.
Figure 4C:
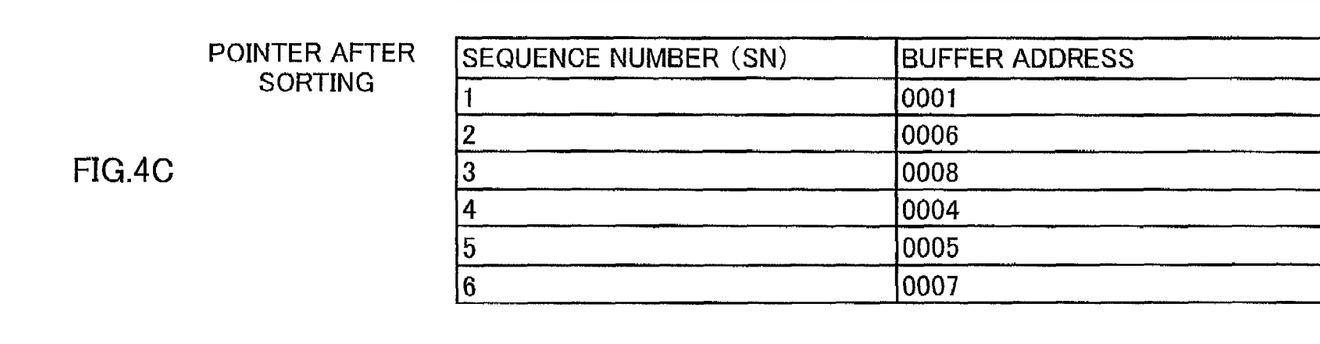
FIG. 4C is an explanatory drawing of the sorting operation of a pointer for retransmission or a preservation pointer in the terminal apparatus according to the above-described embodiment.

Then, sorting of the preservation addresses of the received packets will be described, referring to FIG. 4A through FIG. 4C. FIG. 4A, FIG. 4B, and FIG. 4C are drawings showing one example of memorized contents in the receiving pointer of the terminal apparatus according to the present embodiment. When a packet with a sequence number SN=3 and a buffer address=0008 is received under a state in which the contents of FIG. 4A are memorized in the pointer 104 for playback, the pointer 104 for playback newly memorizes the memorizing position of the packet which has bee newly received. As shown in FIG. 4B, the sequence number SN=3 and the buffer address=0008 are memorized in the pointer 104 for playback following addresses which have been memorized so far.

Then, the pointer 104 for playback sorts the memorized addresses in order of sequence number. FIG. 4C is a drawing showing one example of addresses sorted in order of sequence number. Information with SN=2, and a buffer address=0008 is inserted between the one with SN=3 and the one with SN=4 by sorting them in order of sequence number. Moreover, the pointer 106 for preservation similarly performs sorting operation of pieces of memorized address information in order of sequence number.

Thus, the communication terminal 100 according to the present embodiment decides whether the received time of the packet is before or after the playback time of the packet, and plays back a packet, using the packet for which the received time is before the playback time.

Figure 5:
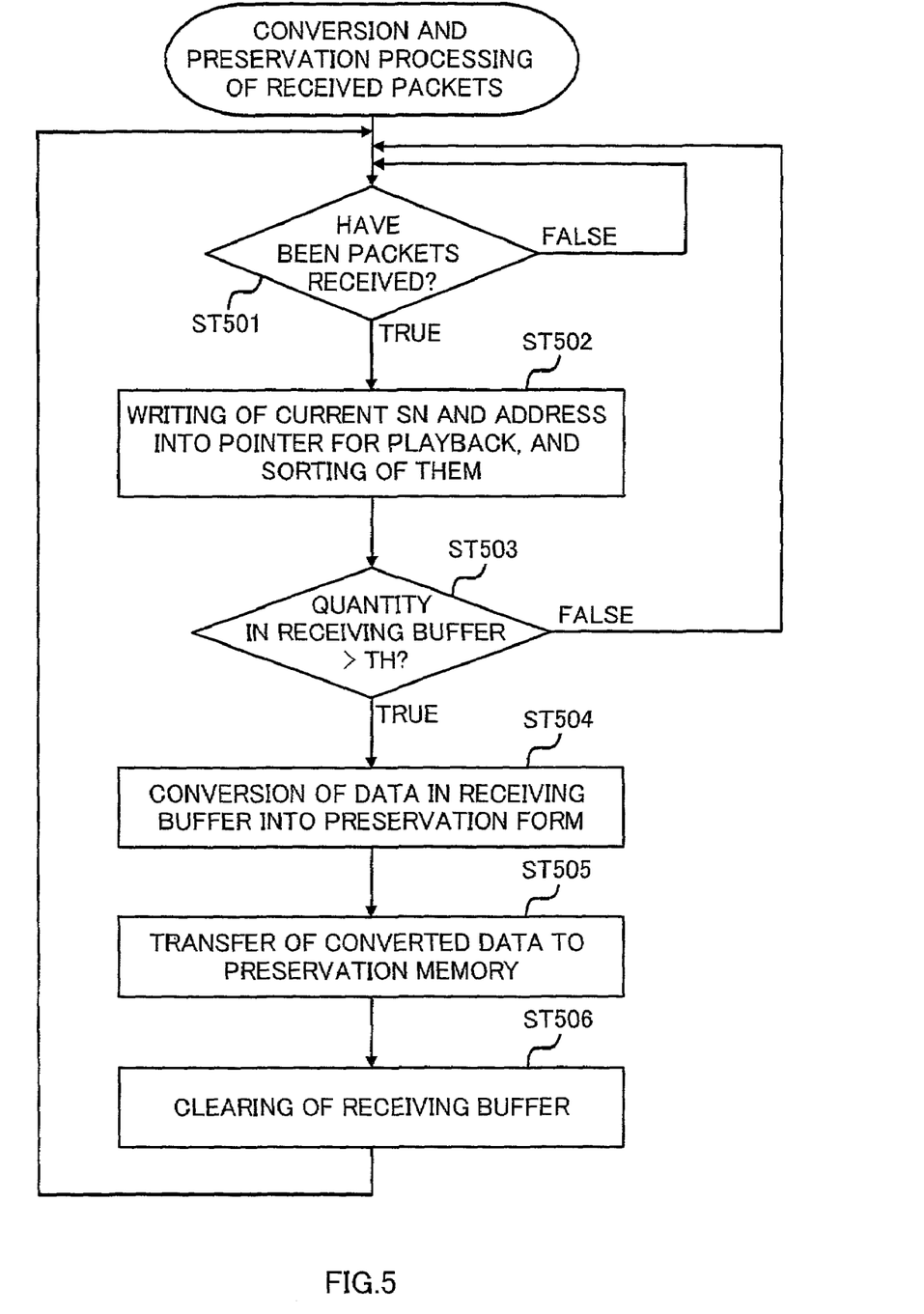
FIG. 5 is a flow diagram showing one example of preservation operation for a received packet in the terminal apparatus according to the above-described embodiment.

Then, operation in which a received packet is preserved will be described. FIG. 5 is a flow diagram showing one example of preservation operation of a received packet in the terminal apparatus according to the present embodiment.

In FIG. 5, it is decided at ST501 whether the receiving section 101 has received a packet. When a packet has been received, the operation proceeds to ST502. At ST502, the pointer 106 for preservation sorts the addresses in the receiving buffer in order of sequence number, after memorizing the sequence number and the address in the receiving buffer for the received packet in correspondence between both of them.

Then, the media conversion section 107 decides at ST503 whether the capacity of packets preserved in the receiving buffer 102 exceeds a threshold TH or not. When the capacity of the preserved packets does not exceed the threshold TH, the operation returns to ST501. And, when the capacity of the preserved packets exceeds the threshold TH, the operation proceeds to ST504.

At ST504, the media conversion section 107 reads out the data preserved in the receiving buffer 102, and converts the read data into ones with a form for preservation in the preservation memory 108. At ST505, the media conversion section 107 transfers the converted data to the preservation memory 108, and the data is preserved in the preservation memory 108. At ST506, data which the receiving buffer 102 has output to the media conversion section 107 are preserved in the preservation memory 108, and the receiving buffer 102 clears areas preserving the other data.

Thus, according to the terminal apparatus according to the present embodiment, a received packet is preserved in the receiving buffer 102; it is decided in the playback decision section 103 whether the preserved packet is in time for the playback time; the playback order and the preservation address of the preserved packet which has been decided to be in time for the above time are memorized in the pointer 104 for playback; and the preserved packet is read according to the pointer 104 for playback.

And, the playback order and the preservation address of the preserved packet are memorized in the pointer 106 for preservation; the preserved packet is read according to the pointer 106 for preservation; converted into a packet with a form by which the preserved packet may be memorized in the preservation memory 108, and memorized there.

Thus, the memorized data may be arbitrarily read later for playback according to the terminal apparatus of the present embodiment, as packet data which are late for the playback time may be memorized without discarding of the data in a different manner from that of a conventional apparatus.

Thus, according to the terminal apparatus of the present embodiment, packets which are late for the playback time such as display time may be preserved at a receiving side without discarding of the packets by the following way: decision to discard packets is performed separately in playback processing and in preservation one; and specifically, packets, which are received before the playback time, are used for both of playback and preservation, and packets, which are received after the playback time, are used only for preservation.

(Embodiment 2)

Figure 6:
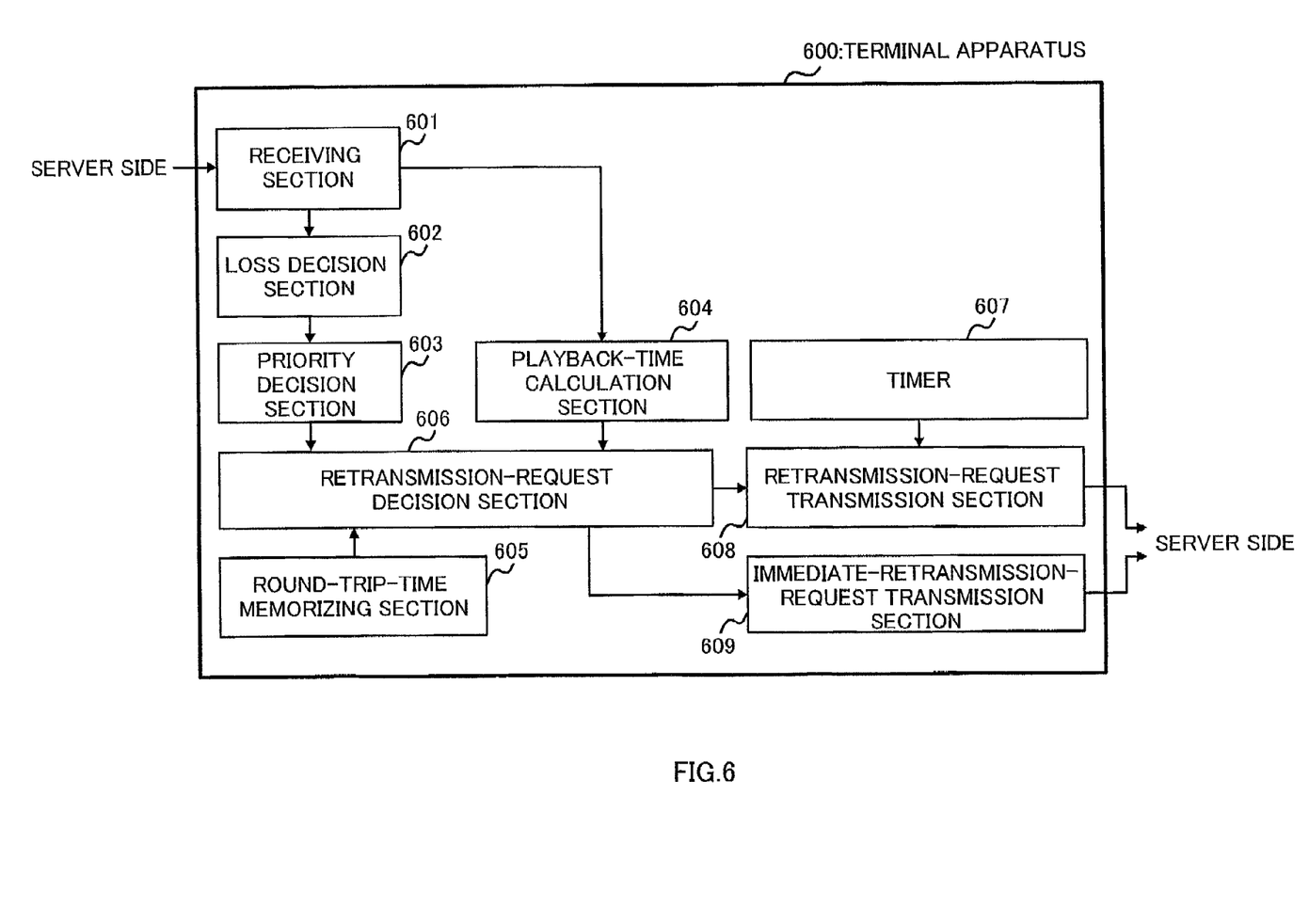
FIG. 6 is a block diagram showing a configuration of a terminal apparatus according to an embodiment 2 of the present invention.
Figure 7:
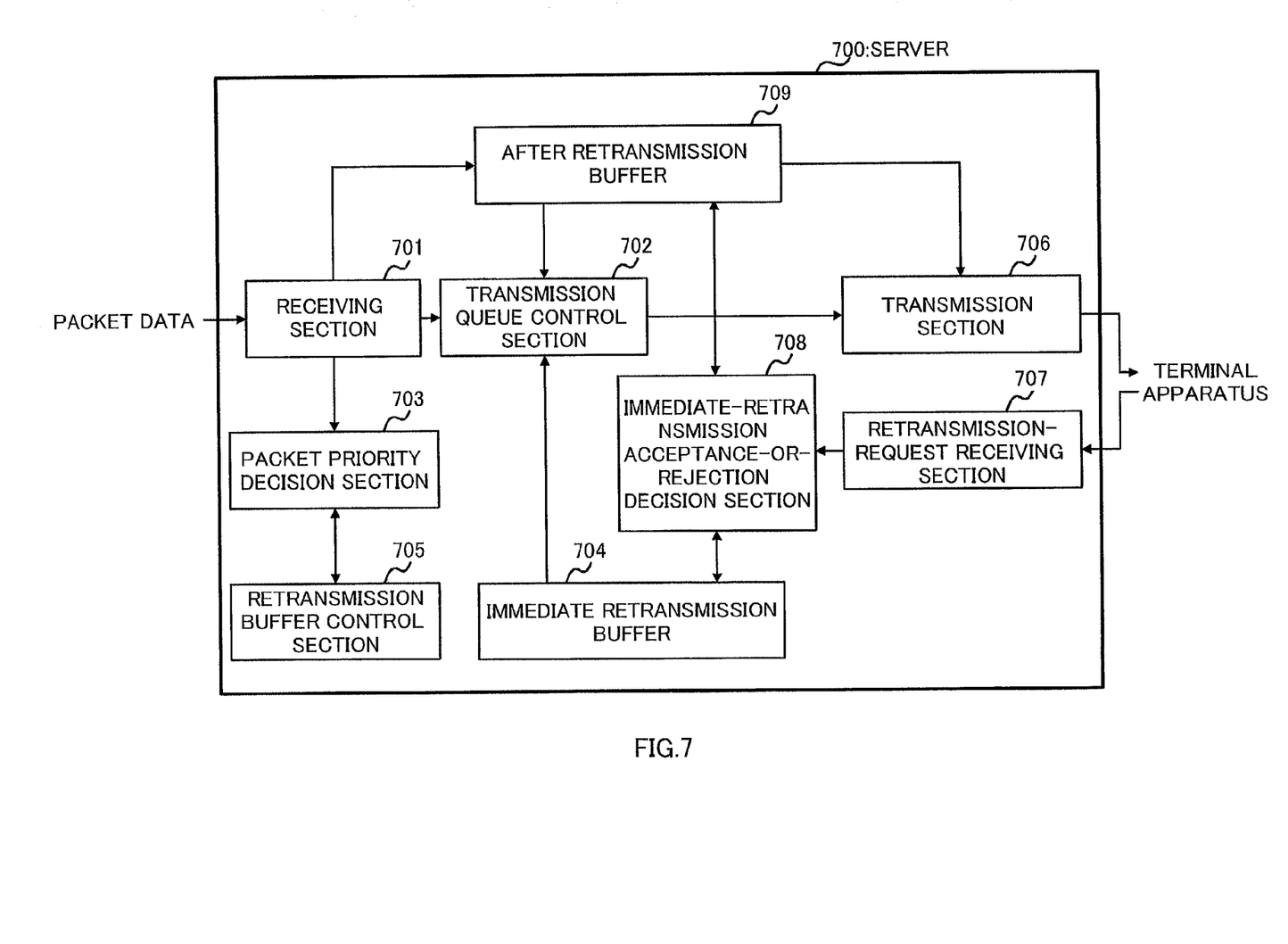
FIG. 7 is a block diagram showing a configuration of a server according to the above-described embodiment.

FIG. 6 is a block diagram showing a configuration of a terminal apparatus according to the embodiment 2 of the present invention. And, FIG. 7 is a block diagram showing a configuration of a server according to the present embodiment. A terminal apparatus 600 in FIG. 6 requests to a server 700 transmission of packets for images and voices, and receives them.

The terminal apparatus 600 mainly comprises: a receiving section 601; a loss decision section 602; a priority decision section 603; a playback-time calculation section 604; a round-trip-time (RTT) memorizing section 605; a retransmission-request decision section 606; a timer 607; a retransmission-request transmission section 608; and an immediate-retransmission-request transmission section 609.

The receiving section 601 receives a packet transmitted from the server 700, and outputs it to the loss decision section 602. And, the receiving section 601 outputs a time stamp TS of the received packet to the playback-time calculation section 604.

The loss decision section 602 decides whether the SN of the received packet is obtained by addition of "1" to the SN of the previously received packet or not, and outputs the decision result to the priority decision section 603. The priority decision section 603 decides whether the priority of the received packet is high or not, and outputs the decision result to the retransmission-request decision section 606.

The playback-time calculation section 604 obtains playback time PLT of a packet by calculation of a relative time based on the assumption that the starting time of the session is "0". Specifically, the playback-time calculation section 604 calculates the difference between the time stamp TS of the current packet and the time stamp TS0 at the starting time of the session to obtain the playback time PLT of the packet.

The round-trip-time memorizing section 605 memorizes the memorized round-trip-time of data which have been received from the server 700. The retransmission-request decision section 606 reads the data round-trip-time from the round-trip-time memorizing section 605, and decides whether the playback time PLT is smaller than the sum of the round trip time and the current time or not. Then, the retransmission-request decision section 606 outputs the decision result to the retransmission-request transmission section 608 and the immediate-retransmission-request transmission section 609. The timer 607 counts time until a retransmission request (usual retransmission request) which is usually performed for a retransmission-request object packet is transmitted.

The retransmission-request transmission section 608 transmits the retransmission request to the server 700 when the decision result of the retransmission-request decision section 606 is a result by which the retransmission is requested. The immediate-retransmission-request transmission section 609 transmits the immediate retransmission request to the server 700 when the decision result of retransmission-request decision section 606 is a result by which the immediate transmission is requested.

The server 700 shown in FIG. 7 mainly comprises: a receiving section 701; a transmission queue control section 702; a packet priority decision section 703; an buffer 704 for immediate retransmission; a buffer control section 705 for retransmission; a transmission section 706; a retransmission-request receiving section 707; an immediate-retransmission acceptance-or-rejection decision section 708; and a buffer 709 for after-retransmission.

In the first place, the operation of the server with the above-described configuration will be described. The server 700 is provided with an application function such as coding of images and voices. The receiving section 701 receives a packet from the application function, and outputs the received packet to the transmission queue control section 702, and the packet priority decision section 703. Moreover, the receiving section 701 preserves the packet in the buffer 709 for after-retransmission.

The transmission queue control section 702 controls the transmission timing of a packet which has been received in the receiving section 701, and out puts the transmission timing of the packet to the transmission section 706. The controlled packet is transmitted from the transmission section 706 to the terminal apparatus 600.

The packet priority decision section 703 decides the priority of a packet which the receiving section 710 has received, and preserves a packet, of which the priority is assumed to be high, in the buffer 704 for immediate retransmission. Here, the priority is assumed previously to be given to the packet by the application function. For example, in the application function, a packet indispensable for playback is assumed to be a packet with high priority, and a packet not indispensable for playback is done to be a packet with low priority. In addition, the priority of the packet may be set stepwise, reflecting the significance in the application function at playback.

A buffer control section 705 for retransmission identifies individual packets, using the sequence numbers given to the packets when the packets are preserved in the buffer 704 for immediate retransmission; and controls in what address memorizing area of the buffer 740 for immediate retransmission the packets are preserved by correspondence between the sequence numbers, and the memorizing addresses of the packets in the buffer 704 for immediate retransmission.

The transmission section 706 outputs the packets output from the buffer 709 for after retransmission according to timing instructed by the transmission queue control section 702. The retransmission-request receiving section 707 receives an immediate retransmission request or a usual retransmission request.

The immediate-retransmission acceptance-or-rejection decision section 708 confirms the request which has been received in the retransmission-request receiving section 707, and decides whether the immediate retransmission is needed or not. Subsequently, the immediate-retransmission acceptance-or-rejection decision section 708 instructs the buffer 704 for immediate retransmission or the buffer 709 for after retransmission based on the decision result to transmit the packets. The buffer 709 for after retransmission memorizes the packets transmitted by usual transmission.

Figure 8:
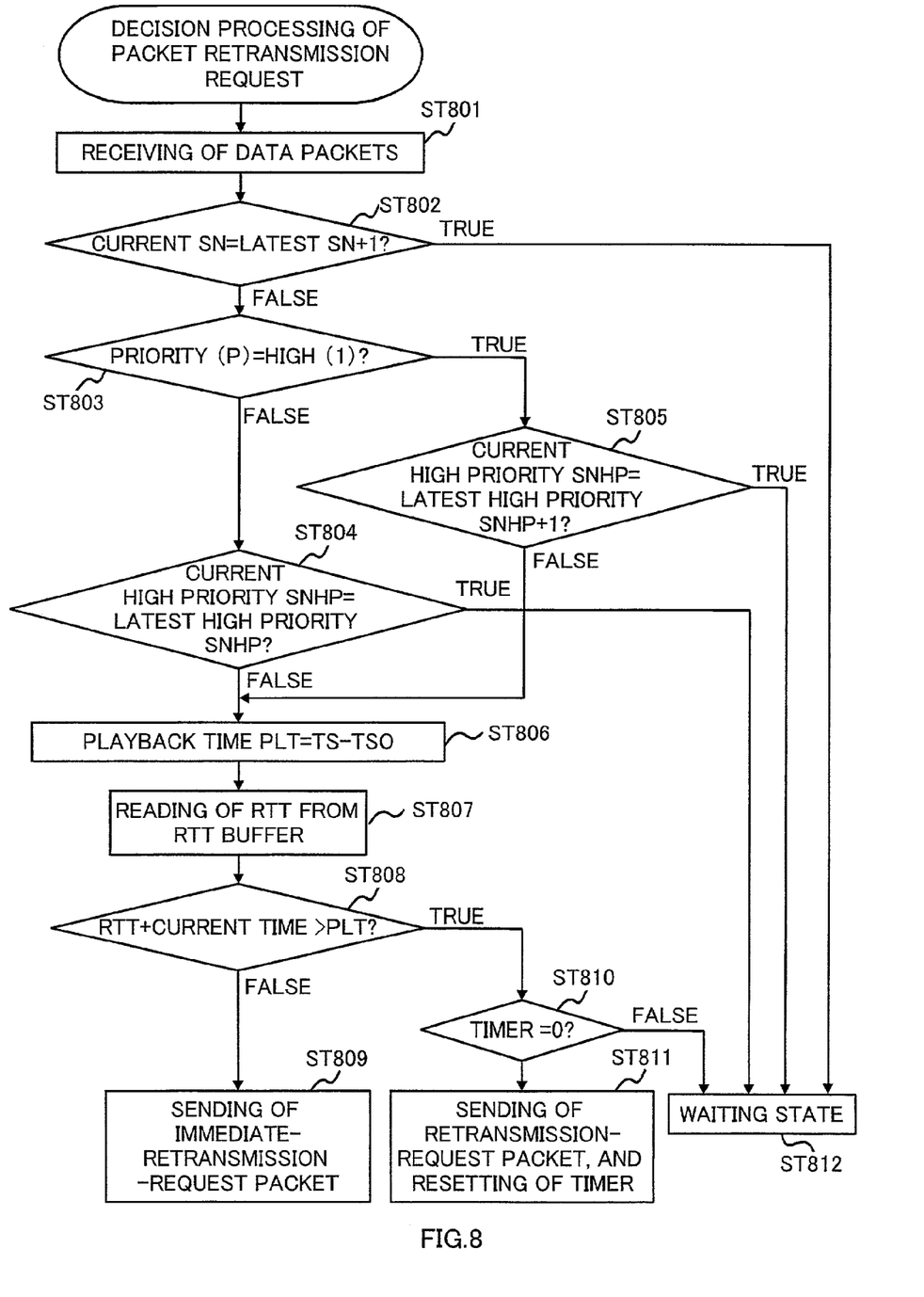
FIG. 8 is a flow diagram showing one example of the operation of the packet-retransmission-request decision processing in the terminal apparatus according to the above-described embodiment.

Then, the operation of the packet-retransmission-request decision in the terminal apparatus 600 will be described. FIG. 8 is a flow diagram showing one example of the operation of the packet-retransmission-request decision in the terminal apparatus according to the present embodiment.

At ST801, the receiving section 601 of the terminal apparatus 600 receives packets output from the server 700.

Figure 9:
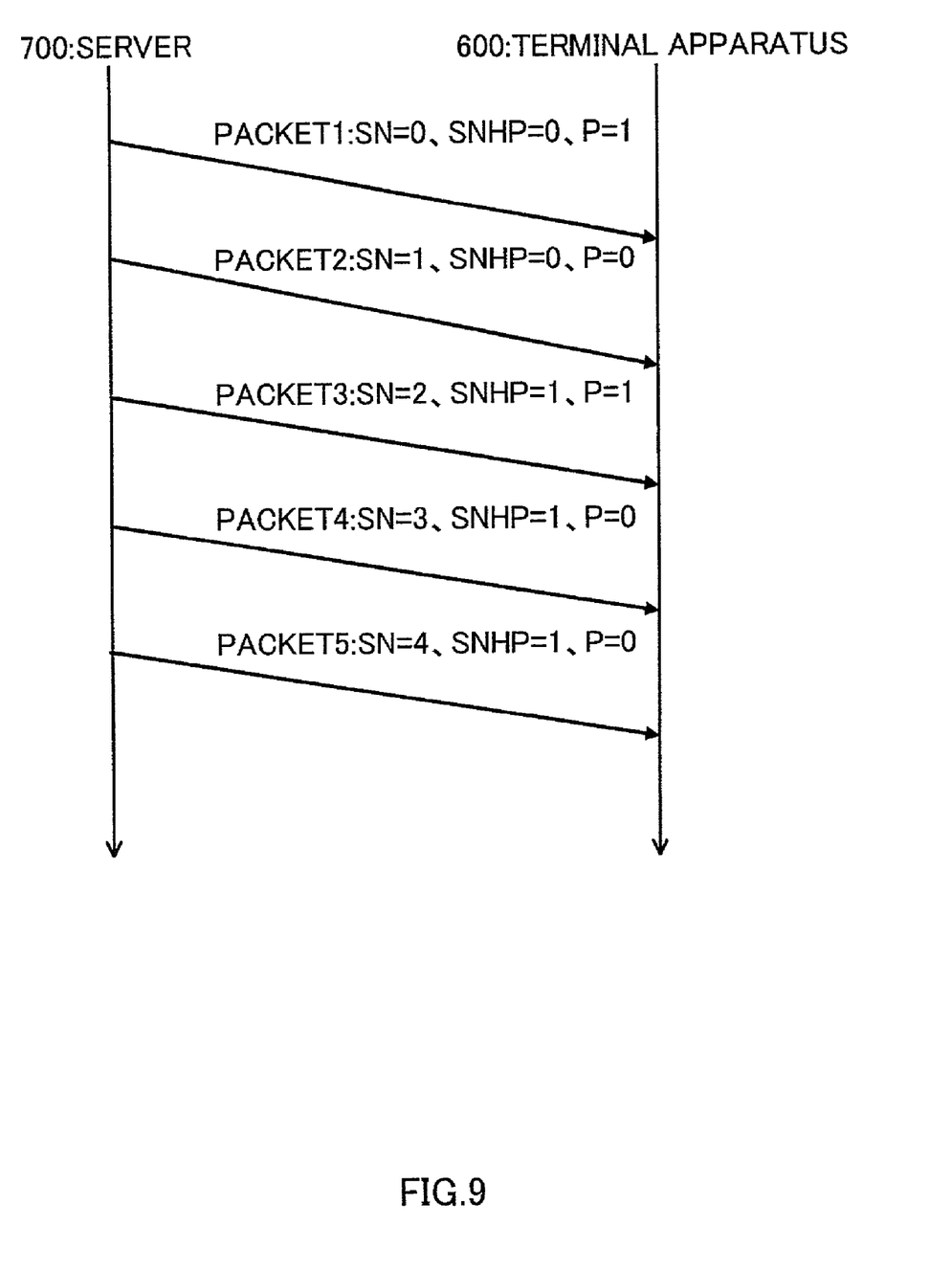
FIG. 9 is an explanatory drawing for a sequence number SN, a high-priority packet sequence number SNHP, and priority P, which are given to transmission packet data from the server to the terminal apparatus according to the above-described embodiment.

The received packets includes packets (P=1) which are high in the priority (high priority), and packets (P=0) which are low in the priority (low priority), as shown in FIG. 9. When the server 100 transmits the packets to which the priority has been given, the sequence numbers recorded in the header fields are increased by one whenever the packets are transmitted.

When the high-priority packets (P=1) are transmitted, the high-priority-packet sequence numbers SNHPs of the high-priority packets (P=1) are also configured to be increased by one. For example, it is configured that the next packet with SN=2 has a sequence number SNHP=1 after addition of "1" to the SNHP, as the priority is the high priority P=1, though a packet with SN=1 has a sequence number SNHP=0, as the priority is the low priority P=0.

Then, the loss decision section 602 decides at ST802 whether the SN of the packet received this time is obtained by addition of "1" to the SN of the packet which has been previously received.

Thereby, there will be a waiting state for receiving at ST812, as it is assumed that there is no lost packet in the packets which have been previously received, when the SN of the received packet is obtained by addition of "1" to the SN of the packet which has been previously received. In the case of the increase in the SN by a value but for "1", it is decided after the next step ST803 whether retransmission request of the lost packet is performed or not, as there is a lost packet between a packet received this time and the packet which has been previously received.

At ST803, the priority decision section 603 decides whether the priority of the received packet is high or not.

As a result, When the priority of a packet which requests retransmission is not high, that is, when the packet has low priority, it is decided at ST804 whether the increment of the current SNHP from the SNHP of the packet previously received is "0" or not. If there is no lost packet in the received packets, SN is increased only by "1", and there is no increase in SNHP.

Thereby, it is decided that there is no lost high-priority packet, and the operation proceeds to ST812, if the increment of SNHP is "0". In the case of the increase in the SN by a value but for "0", it is decided that there is a lost high-priority packet, and the operation proceeds to ST806.

When the current packet is a high-priority packet according to the decided result at ST803, both SN and SNHP are increased by "1", if there is no lost packet. Then, it is decided at ST805 whether the increment of the current SNHP from the SNHP of the high-priority packet previously received is "1" or not.

Therefore, it is decided that there is no lost high-priority packet, and the operation proceeds to ST812, if the increment of SNHP is "1". In the case of the increase in the SN by a value but for "1", it is decided that there is a lost high-priority packet, and the operation proceeds to ST806.

At ST806, the playback-time calculation section 604 obtains playback time PLT of a packet by calculation of a relative time based on the assumption that the starting time of the session is "0". Specifically, the playback-time calculation section 604 calculates the difference between the time stamp TS of the current packet and the time stamp TS0 at the starting time of the session to obtain the playback time PLT of the packet.

At ST807, the retransmission-request decision section 606 reads the data round-trip-time from the round-trip-time memorizing section 605. At 808, the retransmission-request decision section 606 decides whether the above-described playback time PLT is smaller than the sum of the round trip time and the current time or not.

When the playback time PLT is larger than the sum of the sum of the round trip time and the current time, the operation proceeds to ST809, as playback may be performed after receiving retransmitted data. At ST809, the immediate retransmission-request transmission section 609 transmits the retransmission request to the server 700.

When the playback time PLT is smaller than the sum of the round trip time and the current time, the time when a retransmission packet is received comes after time to be played back. At ST810, the retransmission-request transmission section 608 decides whether the timer 607 shows "0" or not.

When the timer 607 shows "0", a retransmission request (usual retransmission request) which is usually performed for a retransmission-request object packet is transmitted at ST811, and the timer 607 is reset. When timer 607 does not show "0", the operation comes to a waiting state at ST812.

Here, information, by which an instruction is made to retransmit the packets after the server 700 receives a retransmission request, for example, when there is a small amount of transmission data, may be added to the usual retransmission request.

Figure 10:
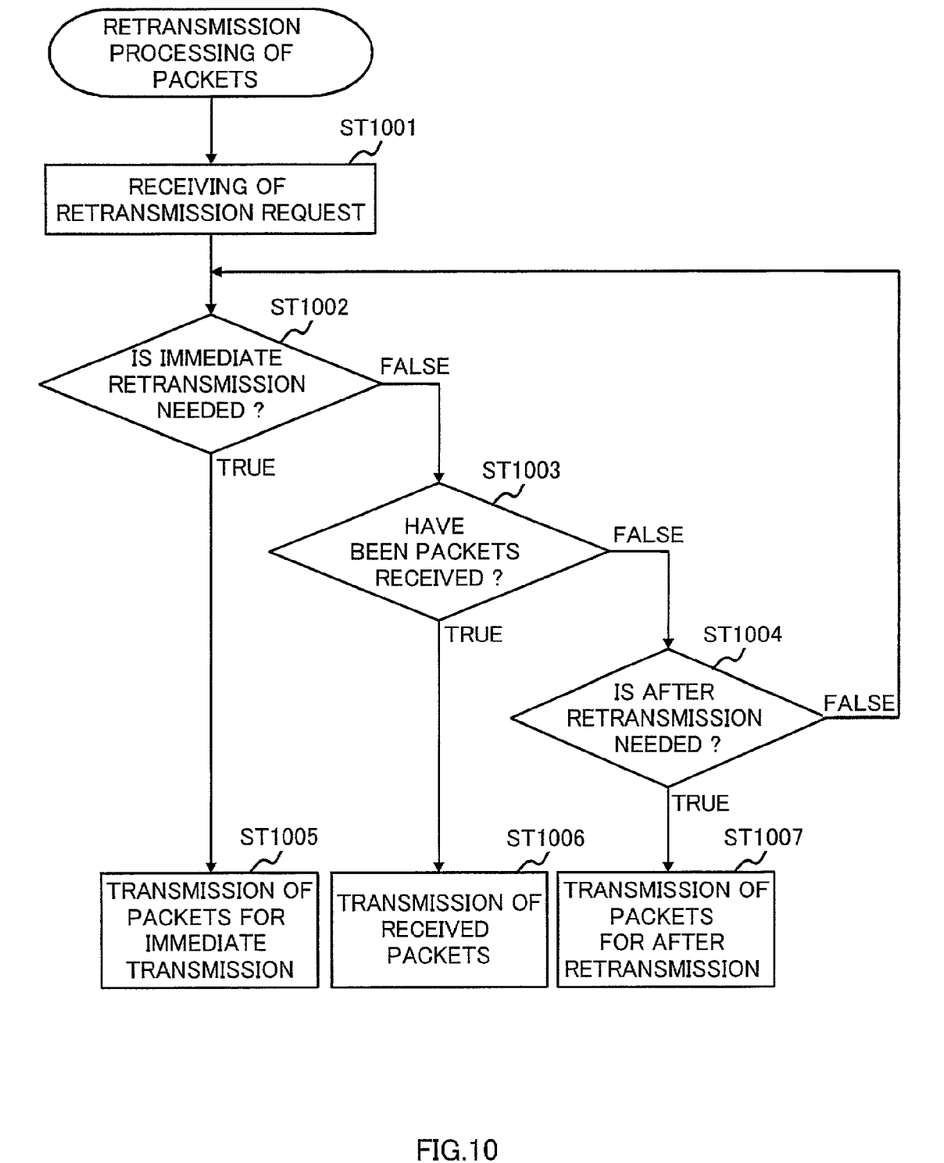
FIG. 10 is a flow diagram showing one example of the operation for packet retransmission processing in a server according to the above-described embodiment.

Then, the packet-retransmission operation of the server 700 which receives an immediate retransmission request or a usual retransmission request will be described. FIG. 10 is a flow diagram showing one example of the operation for packet retransmission processing in the server according to the present embodiment.

At ST1001, the retransmission-request receiving section 707 receives an immediate retransmission request or a usual retransmission request.

At ST1002, the immediate-retransmission acceptance-or-rejection decision section 708 confirms a request which has been received in the retransmission-request receiving section 707, and decides whether the immediate retransmission is needed or not.

When the immediate retransmission is needed, the operation proceeds to ST1005, at which the immediate retransmission is processed. And, when the immediate retransmission is not needed, the operation proceeds to ST1003.

At ST1003, the transmission queue control section 702 decides whether there is a received packet in the receiving section 601. When there is a received packet, the operation proceeds to ST1006, at which the received packet is transmitted. And, when there is no received packet, the operation proceeds to ST1004.

At ST1004, it is decided whether after retransmission by which packets are transmitted later is needed or not. Here, the after retransmission is, for example, to perform packet transmission later, when there are a small amount of transmission data. When the after retransmission is needed, the operation proceeds to ST1007, at which the after transmission processing is performed. When the after retransmission is not needed, the operation returns to ST1002.

At ST1005, the transmission queue control section 702 reads packets corresponding to the immediate request from the buffer 704 for immediate retransmission, and transmits them from the transmission section 706 to the terminal apparatus 600. At ST1006, the transmission section 706 transmits the received packet. At ST1007, an after-retransmission packet is read from the buffer 709 for after retransmission, and transmitted from the transmission section 706, for example, when there are a small amount of transmission data.

Thus, according to the terminal apparatuses 600, 700 of the present embodiment, the terminal apparatus 600 decides the presence of the lost packet data and the priority, when packet data are received; calculates the playback time of the received packet data; and performs the immediate retransmission request of the lost packet data with high priority when the sum of the round-trip-time of the data to and from the transmission side and the current time is smaller than the playback time, and makes the usual retransmission request when the sum is larger than the playback time. Accordingly, the server 700 memorizes the packet data for transmission; performs immediate retransmission of memorized packet data corresponding to a immediate-retransmission request when the immediate-retransmission request is received; and retransmits, when a usual-retransmission request is received, memorized packet data corresponding to the usual-retransmission request only in the case of no transmission packet data.

Packet data for which retransmission request has been made may be played back without failure by the above-described processing, as retransmission request is made only when retransmission of lost packet data is in time for the playback. Moreover, the transmission bands may be effectively used, as lost packet data are retransmitted in the case of usual retransmission request only when there is in the server 700 no packet data to be transmitted to the terminal apparatus 600.

Here, retransmission is performed in the above-described examples, only when there are a small amount of usual data, and that of immediate-retransmission-request data. But, without limiting to the above examples, retransmission may be performed all together after completion of data transmission. Moreover, retransmission is performed, only when there are a small amount of usual data, and that of immediate-retransmission-request data, and another retransmission may be performed all together after completion of data transmission when there are left retransmission data after completion of data transmission.

As is evident from the above description, packets which are late for the playback time such as display time may be preserved at a receiving side without discarding of the packets, and useless use of transmission bands, which is caused by retransmission of packets, may be controlled.

The present description is based on the prior Japanese Patent Application No. 2000-206615, filed on Jul. 7, 2000. The entire contents are incorporated herein by reference.

The invention claimed is:

1. A data receiving apparatus, comprising:
a loss decision unit that decides whether or not there are packets missing among received packets;
a priority decision unit that distinguishes between packets that are indispensable for playback and packets that are not indispensable for playback based on information of an application by which said packets are played back;
a retransmission request decision unit that decides, after retransmission of said missing packets is requested, whether a packet playback time for each of the missing packets is before or after an expected retransmission reception time of the missing packet; and
a retransmission request unit that: (i) transmits a retransmission request for each of the missing packets that are indispensable for playback and expected to be received through retransmission before the corresponding playback time of said missing packet and (ii) transmits a retransmission request for each of the missing packets that are not indispensable for playback when an amount of data received from a transmission apparatus is less than a threshold.

* * * * *